United States Patent
Jin et al.

[11] Patent Number: 6,122,652
[45] Date of Patent: Sep. 19, 2000

[54] TONE AND PERIODICAL SIGNAL DETECTION

[75] Inventors: Gary Q. Jin, Kanata; Gordon J. Reesor, Russell, both of Canada

[73] Assignee: Mitel Corporation, Kanata, Canada

[21] Appl. No.: 09/161,434

[22] Filed: Sep. 24, 1998

[30] Foreign Application Priority Data

Oct. 24, 1997 [GB] United Kingdom .................. 9722446

[51] Int. Cl.[7] .................................................. G06F 17/10
[52] U.S. Cl. ............................................................. 708/312
[58] Field of Search .......................... 708/309, 311–312; 379/386; 702/75–76

[56] References Cited

U.S. PATENT DOCUMENTS

| | | | |
|---|---|---|---|
| 4,326,261 | 4/1982 | Peoples | 708/309 |
| 4,990,848 | 2/1991 | So | 702/76 |
| 5,070,526 | 12/1991 | Richmond et al. | |
| 5,119,322 | 6/1992 | Stroobach. | |
| 5,251,256 | 10/1993 | Crowe et al. | 708/312 |
| 5,274,579 | 12/1993 | Nelson et al. | 708/312 |
| 5,533,118 | 7/1996 | Cesaro et al. | |
| 5,576,983 | 11/1996 | Shiokawa. | |

FOREIGN PATENT DOCUMENTS 0 573 760 A1  12/1993  European Pat. Off. .
2 219 174A    11/1989  United Kingdom .

*Primary Examiner*—Tan V. Mai
*Attorney, Agent, or Firm*—Marks & Clerk

[57] ABSTRACT

Algorithms for quickly and efficiently detecting a periodic signal such as a DTMF signal in a telephone system are described. The algorithms, implemented in a tone detector, detect the periodicity of the input data and do not require an estimation of the tone frequency.

8 Claims, 6 Drawing Sheets

NOTE: IF THE SWITCH TURN TO 0, *COUNT1* AND THE CORRESPONDING *SUM* WILL BE AT *THE SWITCH LOCATION*, AND *COUNT2* AND THE CORRESPONDING *SUM* WILL BE AT THE *NON-SWITCH LOCATION*. THE SITUATION IS REVERSE IF THE SWITCH TURNS TO 1.

TONE AND PERIODICAL SIGNAL DETECTION

FIELD OF INVENTION

This invention relates to the detection of a tone or any other periodical signal in a telephone system. More specifically it relates to a method and system for distinguishing a speech or noise from any tone-like signal which is periodical. The periodic signal may be either single frequency or have multiple frequency components. The new algorithm according to the invention is very easy to implement and with the algorithm a tone-like signal can be detected in a very short period of time. Test results show that the probability of erroneous detection is very low.

This invention has evolved from work that has been done on system design of acoustic and network echo cancellers. First, there will be provided a brief background on the previously used algorithms for the detection of tone-like signals, which could be, for example, DTMF signals or fax/modem signals. A common feature of these signals is that they have a strong periodicity. When these signals are present in a telephone system, the Least Mean Square (LMS) algorithm used for echo cancellation will start to diverge slowly. To prevent the divergence of the LMS algorithm, the tone-like signal must be detected first and then the adaptation for the LMS algorithm is frozen. In this scheme, the tone detection algorithm plays a crucial role.

How to detect a DTMF tone with a very short on/off period has been a challenging problem to all previously implemented tone detection algorithms. In the present invention two efficient tone detection algorithms are introduced. They are simple and easy to implement. With the new algorithms, narrow-band tones like DTMF signals and fax/modem signals can be efficiently detected in a very short period of time.

In conventional telephone echo cancellation systems, a tone detector is often required. As soon as the tone signal is detected in the system, the adaptive LMS algorithm for echo cancellation must be stopped so that the divergence of the LMS algorithm can be prevented.

In the telephone system, a tone signal could be either a single frequency or a multi-frequency signal. A common example is a DTMF signal consisting of dual-tone frequency components. The purpose of the tone detection is to detect any tone signals that have a strong periodicity. Currently, there are many tone detection algorithms available. The commonly used methods are zero-crossing counting, spectrum peak estimation and the peak to RMS ratio calculation. The zero-crossing counting algorithm is the simplest algorithm, but it is sensitive to noise and takes a long time to detect a tone-like signal. Although the spectrum peak estimation gives accurate tone estimation, the Fast Fourier Transfer (FFT) computation and the peak detection require a relatively large amount of computation. Also, the spectrum estimation with FFT is not a recursive algorithm and data memory is required. The peak to RMS ratio estimation is a relative simple algorithm, but it is accurate only for single frequency signals. For the dual frequency DTMF signal, the ratio is not stable, and it varies with the initial time and the tone frequency. Also, the DTMF signal is often a pulse-like signal with "ON" and "OFF" periods. Both the "ON" and the "OFF" periods could be very short in time. If the starting point of the "ON" period and the pulse duration are unknown, the RMS calculation will be very unstable. As a result, the peak to RMS ratio will not provide a reliable tone indication.

SUMMARY OF THE INVENTION

Fortunately, for tone detection in the telephone echo canceller, it is not necessary to know the frequency of the tone signals. This helps to simplify the tone detection algorithm. In the present invention two tone-detection algorithms, that can detect the tone signal accurately in a short period of time, are presented. The main idea of these algorithms is to detect the periodicity of the signal. No frequency estimation is required. The new tone detection algorithms can detect any tone-like signal, no matter whether it is a single frequency tone or a multi-frequency tone. The major advantages of the new algorithms are that they are simple to implement and their computation cost is minimized.

Therefore, in accordance with a first aspect of the present invention there is provided a tone detector for detecting periodic tones within a data signal comprising: means to segment the data signal into fixed length data samples; a central counter to count the data samples and to prepare a data window therefrom; a peak value detector to monitor the data samples and to detect a sample having a peak value within the data window; first and second summation means for alternatively receiving and counting the data signals; switch means responsive to the central counter to alternatively switch the data samples between the first and second summation means; means in the first and second summation means to determine if the summations made thereby are valid; and decision means to compare valid summations from the first and second summation means with a threshold value and to determine therefrom whether the summation represents periodic tone.

In accordance with a second aspect of the present invention there is provided a method of detecting a periodic tone in a data signal comprising: a) forming fixed-length data samples from the data signal; b) monitoring first and second data windows each comprising data samples taken sequentially from the data signal; c) finding the peak value and location of the peak value in each of the data windows; d) calculating the total energy value of the data samples in the data window; e) finding a correlation value respecting the data window; and f) comparing the correlation value and the total energy for each window with a preset threshold to determine whether the data signal is a periodic tone.

In accordance with a further aspect of the present invention there is provided a method of detecting a periodic tone in a data signal comprising: a) forming fixed length data samples from the data signal; b) monitoring first and second data windows each comprising data samples taken sequentially from the data signal; c) finding the peak value and location of the peak value in each of the first and second data windows; d) calculating the p-norm summation for each peak value and location; and e) comparing the p-norm summations with a threshold to determine whether the data signal is a periodic tone.

BRIEF DESCRIPTION OF THE DRAWINGS

The invention will now be described in greater detail with reference to the attached figures wherein.

DETAILED DESCRIPTION OF THE INVENTION

Figure 1:
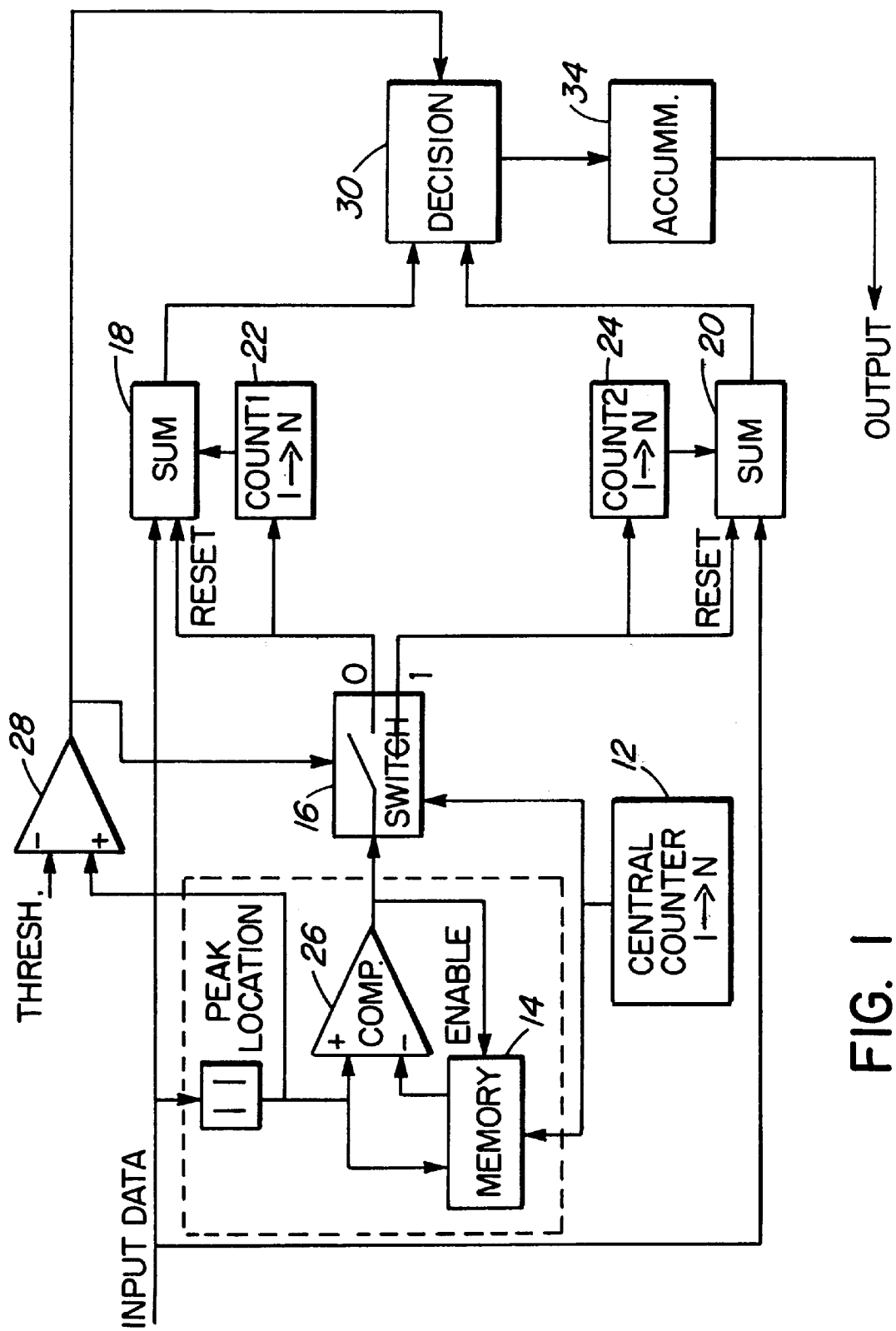
FIG. 1 a block diagram illustrating the implementation of one embodiment of the present invention.

Initially, an explanation of the two algorithms according to the present invention will be provided. Let s(t) be a signal with a minimum period T such that:

$$s(t)=s(t-kT),$$

for any integer k. It is well known that for any real value $T_1$, we have $$\frac{\int_{t_0}^{t_0+T_1} s(t)s(t-kT)dt}{\sqrt{\int_{t_0}^{t_0+T_1} s^2(t)dt \int_{t_0}^{t_0+T_1} s^2(t-kT)dt}} = 1, \quad (1)$$

which means that s(t) and s(t−kT) are correlated. Therefore, by checking the correlation between s(t) and s(t−kT), it is possible to detect any tone-like signal which is periodical. However, in most cases, the period T is unknown. To check the correlation for all values of T will be very time consuming and not computational efficient.

In the new algorithm, in order to let the correlation be calculated at the right time period, we try to find a distinct location of the signal in a period. Let $T_2 > T$ and the peak of s(t) in:

$$t_0 < t < t_0 + T_2 \text{ be } t_1,$$

i.e.

$$t_1 = \underset{t}{\operatorname{argmax}} |s(t)|, \quad (t_0 < t < t_0 + T_2)$$

Similarly, we find the maximum location of |s(t)| in time $$t_0 + T_2 < t < t_0 + 2T_2,$$

i.e., $$t_2 = \underset{t}{\operatorname{argmax}} |s(t)|, \quad (t_0 + T_2 < t < t_0 + 2T_2).$$

If |S(t)| has only one maximum location in a period, we will have:

$$t_2 = t_1 + kT,$$

where k is an integer.

Therefore:

$$\frac{\int_{0}^{T_2} s(t+t_1)s(t+t_2)dt}{\sqrt{\int_{t_1}^{t_1+T_2} s^2(t)dt \int_{t_2}^{t_2+T_2} s^2(t)dt}} = 1, \quad (1)$$

For the sampled signal, the algorithm can be summarized in the following steps:
1. Choose a window of N samples (N is larger than the maximum period of the periodical signals dealt with). In this window, we have signal samples $[x_1, \ldots, X_N]$.
2. Let $a_0 = \max[|x_1|, \ldots, |X_N|]$ and the location of the maximization is $k_0$ ($a_0 = |x_{k_0}|$). Let $a_1 = \max[|X_{N+1}|, \ldots, |X_{2N}|]$ and the location of the maximization is $k_1$ ($a_1 = |X_{k_1}|$)
3. Calculate the energy $$E_0 = \sum_{k=k_0}^{k_0+N-1} x_k^2,$$

$$E_1 = \sum_{k=k_1}^{k_1+N-1} x_k^2,$$

and the correlation, $$r = \sum_{k=1}^{N} x_{k_0+k-1} x_{k_1+k-1}$$

4. If $$\frac{r^2}{E_0 E_1} > \Upsilon$$

(a threshold), it is a tone, otherwise it is not.

In the above embodiment, the peak location $a_0$ in the first window can be obtained with the following iterative method (similar procedure can be applied to the peak location $a_1$ in the second window):

$a_0 = 0;$
$k_0 = 0;$

```
for (k=1;k<=N;++k)
{
    if(a0 < |xk|)
    {
        a0 = |xk|;
        k0 = k;
    }
}
```

After $k_0$ is located, the correlation can be calculated only at the end of second data window when $k_1$ is located. For the worst case, a memory of 2N data samples is required. In the application when the data memory is available, such as in the LMS algorithm and FIR filtering, no extra cost is introduced for the data memory. Only the peak location has to be remembered so that the right data can be extracted from the memory for the correlation calculation.

For the application where the data memory is not available, 2N extra data memory might be too expensive for tone detection. In such a case, the modified algorithm of the following second embodiment can be used.

This embodiment requires no data memory. It is based on the idea that for a periodical signal s(t) with period T, any operator enforced on s(t) and s(t−kT) will present the same output, where k is an integer. The most commonly used operator is p-norm operator, i.e., $$\int_{t_0}^{t_0+T_1} |s(t)|^p \, dt,$$

which gives out the same output as $$\int_{t_0+kT}^{t_0+kT+T_1} |s(t)|^p \, dt$$

for any $T_1$ and p. Among all the p-norm operators, the simplest operator with minimum computation is p=1.

If the p-norm operator is enforced on the sampling data in different data windows, all starting from the peak location, the result will be the same. Based on this fact, the tone detection procedure can be summarized as follows:

1. Choose a window of N samples (N is larger than the maximum period of the periodical signals dealt with). In this window, we have signal samples $[x_1, \ldots, X_N]$.
2. Let $a_0 = \max[|x_1|, \ldots, |X_N|]$ and the location of the maximization is $k_0$ ($a_0 = |x_{k0}|$). Let $a_1 = \max[|X_{N+1}|, \ldots, |X_{2N}|]$ and the location of the maximization is $k_1$ ($a_1 = |X_{k1}|$).
3. Calculate the p-norm $$P_0 = \sum_{k=k_0}^{k_0+N-1} |x_k|,$$

$$P_1 = \sum_{k=k_1}^{k_1+N-1} |x_k|,$$

4. If $$\frac{|P_1 - P_0|}{P_1 + P_0} < \frac{\Upsilon}{2}, \quad (2)$$

it is a tone. Otherwise, it is not. In Eq. (2), Y is a threshold.

The same as for the peak location, both $P_0$ and $P_1$ can be updated recursively. The following routine is for $P_0$ updating, and the same routine can be used of $P_1$ updating:

```
a0=0;
P0=0;
for (k=1;k<=N;++k)
    {
    if (a0 < |Xk|)
        {
        a0 = |Xk|;
        k0 = k;
        P0 = 0;
        }
    P0 = P0 + |Xk|;
    }
``` for (k=N+1; k<=k₀+N−1; ++k)
    P₀=P₀+|X_k|;

Inside the first "for" loop, $P_0$ is reset whenever a new peak is located. The purpose of the second "for" loop is to finish the N point summation of $|x_k|$, starting from the peak location $k_0$ of the first data window and ending at location $k_0−1$ of the second data window.

In this new embodiment, the tone detector becomes much simpler with no multiplication being used and no data memory being required. The main operations are counting and addition. However, the detection performance is slightly inferior to that of the algorithm of the first embodiment. Embodiment 1 can tolerate much lower signal-to-noise ratio and works better under an imperfect environment such as when the signal is distorted by the transmission medium and is not a perfect periodical. Overall, for telephone echo cancellation, both tone detection schemes are very reliable and the second embodiment is simpler.

In the following description, the implementation of the tone detection according to the second embodiment will be discussed first with reference to FIGS. 1 and 2A–2B. The implementation of the first embodiment, which is similar, will be described subsequently with reference to FIGS. 3 and 4A–4B.

FIG. 1 is an implementation diagram for the second embodiment, the details of which are explained as follows:

1. Central counter 12 controls the peak detection in the data window. Whenever it reaches N, the memory 14 is reset and the switch 16 alternates from 0 to 1 (or vice verse). In the mean time, the counter 12 returns to 1 and starts counting again.
2. There are two summation blocks 18, 20 that work on different data windows, controlled by two different counters 22, 24 (count 1 and count 2). The summation stops when the corresponding counter reaches N. Therefore, the summation only contains N data points.
3. The peak calculation works as follows: the peak value is stored in the memory 14. When the absolute value of the incoming data point is larger than the peak value, the comparator 26 output is "1", which enables the memory 14 to accept the new peak value. Through the switch 16, the comparator 26 output also resets either the count 1 or the count 2, and the corresponding summation block 18, 20. In such way, it can be guaranteed that the summation always starts from the peak location of the data window.
4. When the summation of N data points is finished, it is necessary to decide whether this summation is valid or not. The summation is valid only if all the data in the summation block is in the "ON" period. This is because many tone signals are "cadence" signals with "ON" and "OFF" periods. If the data summation contains part of the "ON" period and part of the "OFF" period, the summation is invalid. The threshold 28 has two functions: first, it checks the starting point of the summation, and second it checks the stopping point. If both are in the "ON" period, the summation is valid because the "OFF" period is usually larger than "N". When the central counter 12 reaches "N", the current data is checked and if it is large enough, the data point is in the "ON" period (the summation starts at the peak value which is at least equal to the current data) and the tone detection operation proceeds (the switch 16 is switched and the counter keeps counting). Otherwise, the data point is in the "OFF" period which means that the summation starts at the "OFF" period. In this case, the switch 16 will not be switched, and the corresponding counter (either counter 22 or counter 24) and the summation will be reset. After the starting point of the summation is verified to be in the "ON" period, the threshold 28 will check again as to whether the summation also stops during the "ON" period. When either counter 22 or counter 24 reaches "N", the threshold 28 will check as to whether the last data in the summation is large enough. If it is, the last data point is also in the pulse "ON" period. This summation is a valid summation and the sum is sent to the decision block 30. Otherwise, the summation is invalid and will not be used for tone detection. In the above it is assumed that "N" is smaller than the minimum signal pulse width.

5. The valid output from the summation block is sent to the decision block 30. When both summation blocks 18,20 are finished, a tone decision is made based on Eq.(2).

6. The tone decision will be further passed to the accumulation block 34, where the final decision is made. If half of the M decision block output shows that it is a tone, the final decision is a tone. Otherwise, it is not a tone.

There are a couple of parameters in the tone detection algorithm. They will be discussed briefly in this section:

1. N is the data window length. If N is large, more reliable tone decision can be made.

However, as mentioned before, N must be smaller than the data pulse width. In general, because one tone decision requires two data windows, one DTMF pulse must contain at least two valid summation calculations. Considering that the initial time is unknown, we choose N such that it is smaller than $\frac{1}{3}$ of the minimum tone "on" time. Also N cannot be too small because it must be larger than the largest signal period dealt width. For DTMF signal, we consider the minimum pulse with is 35 ms. to 40 ms., i.e., 280 to 320 sampling data points with 8 KHz signal sampling rate. A suitable value for N is 61, which means that the minimum repeat frequency of the periodical signal is 131 Hz.

2. The threshold Y in Eq. (2) is to set the boundary between tone-like signal and non-tone signal. Because the algorithm is very stable, we may have a relative large range for Y, 0.05 being a suitable value.

3. The low threshold in FIG. 1 should be a little bit above the noise floor. Its value selection depends on the application.

4. The value M in the accumulation block 34 is chosen based on the requirement. Large M means more conservation for the tone estimation and also a longer time for tone detection.

Based on the fact that the LMS algorithm diverges very slowly with tone-like signals, we give a large M (100) for a reliable tone indication. Combining M=100 with N=61, tone-like signals will be detected in less than 1 sec. when the tone-like signal is pulse shaped with half of the time being an "ON" period and half the time being an "OFF" period. Half of the summation periods will be invalid and the detection time will be doubled. A continuous stream of DTMF digits may be detected in about 1.5 sec. This is an acceptable value. When the tone signal is finished, it is required that the tone decision will be released quickly. In such case, M is set as 10 so that the tone decision will be released in about 75 ms.

Figure 2A:
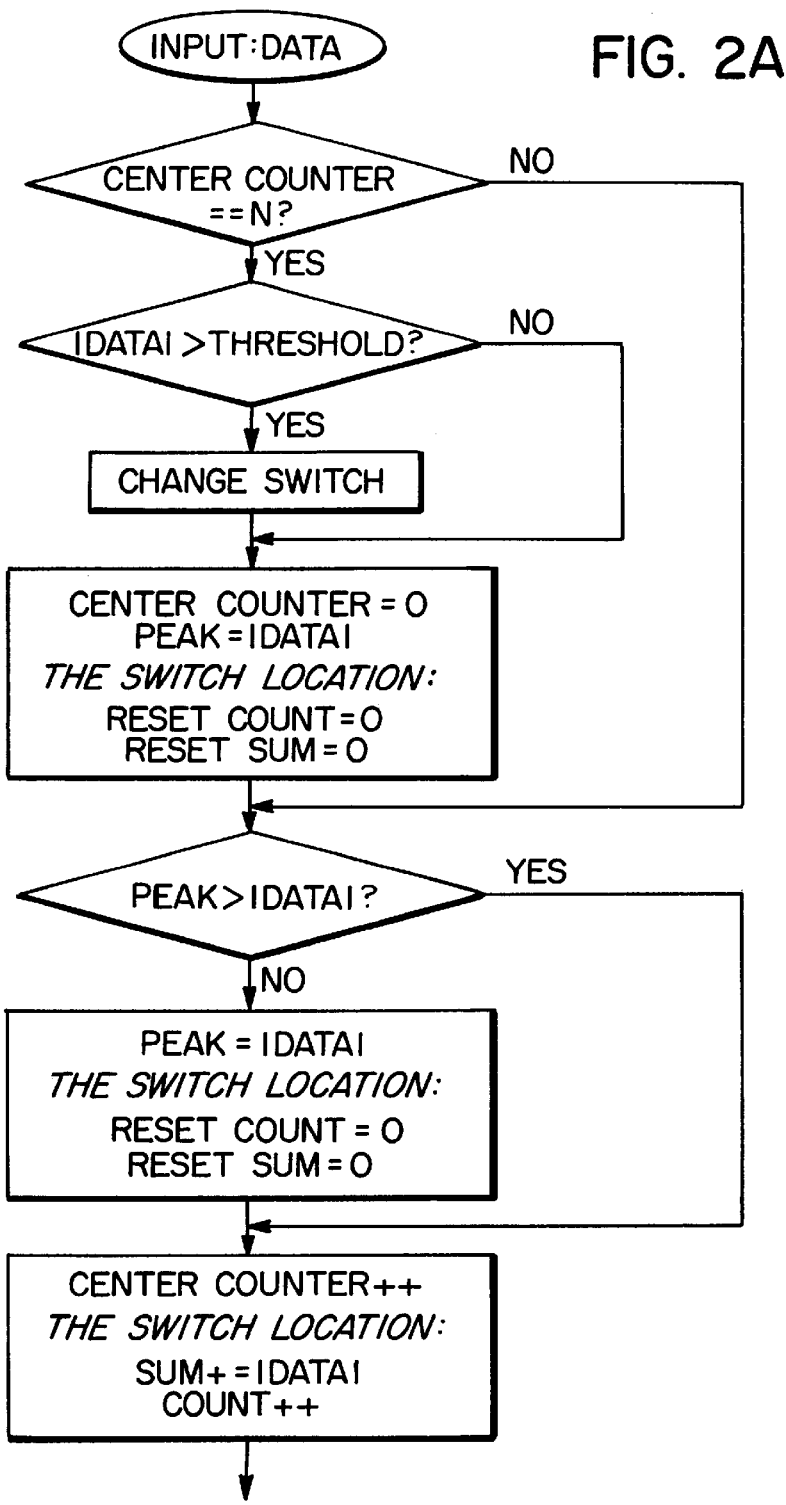
FIGS. 2A–2B is a flow chart of the process steps of the implementation of FIG. 1.
Figure 2B:
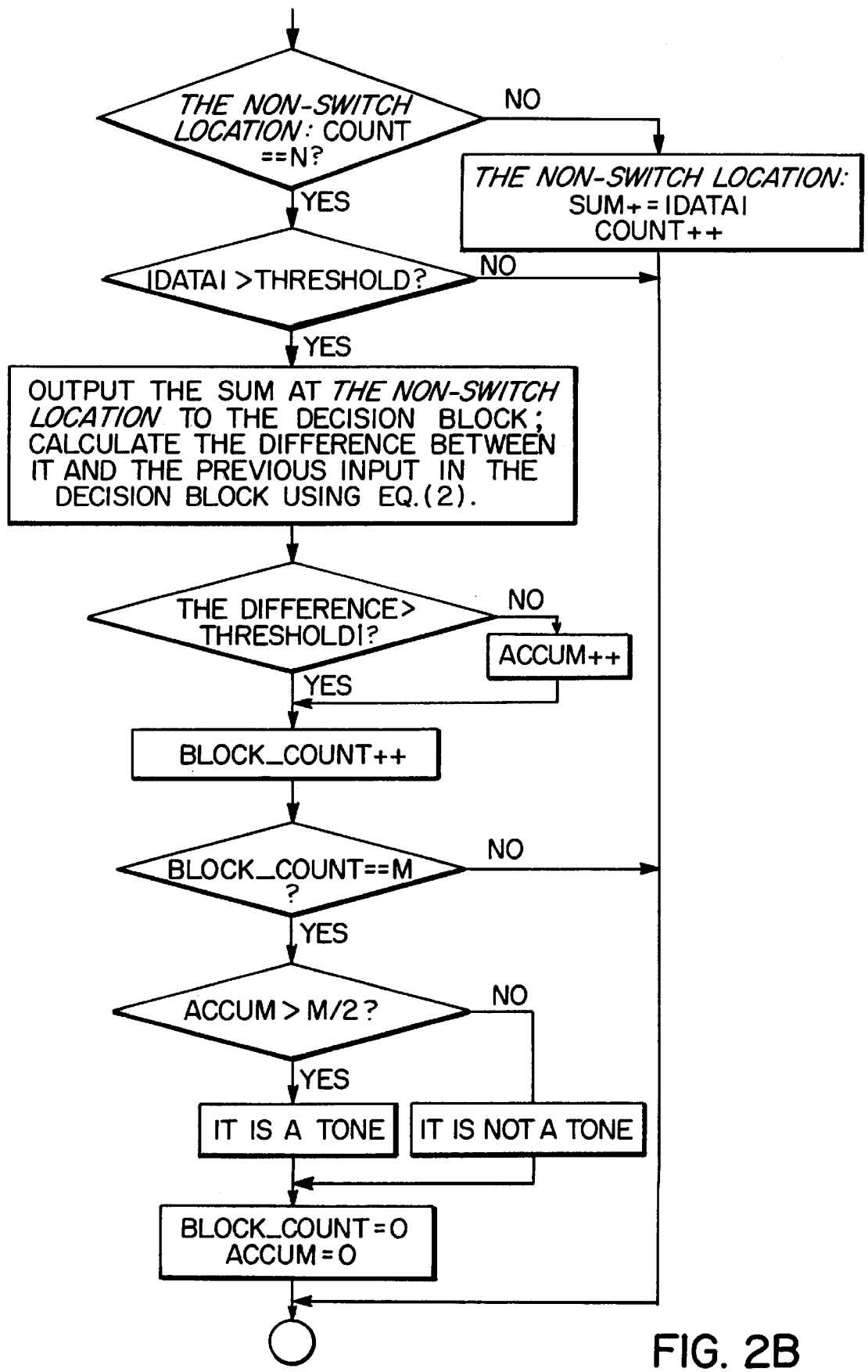

FIGS. 2A–2B is a flow chart of the implementation process according to the second embodiment.

Figure 3:
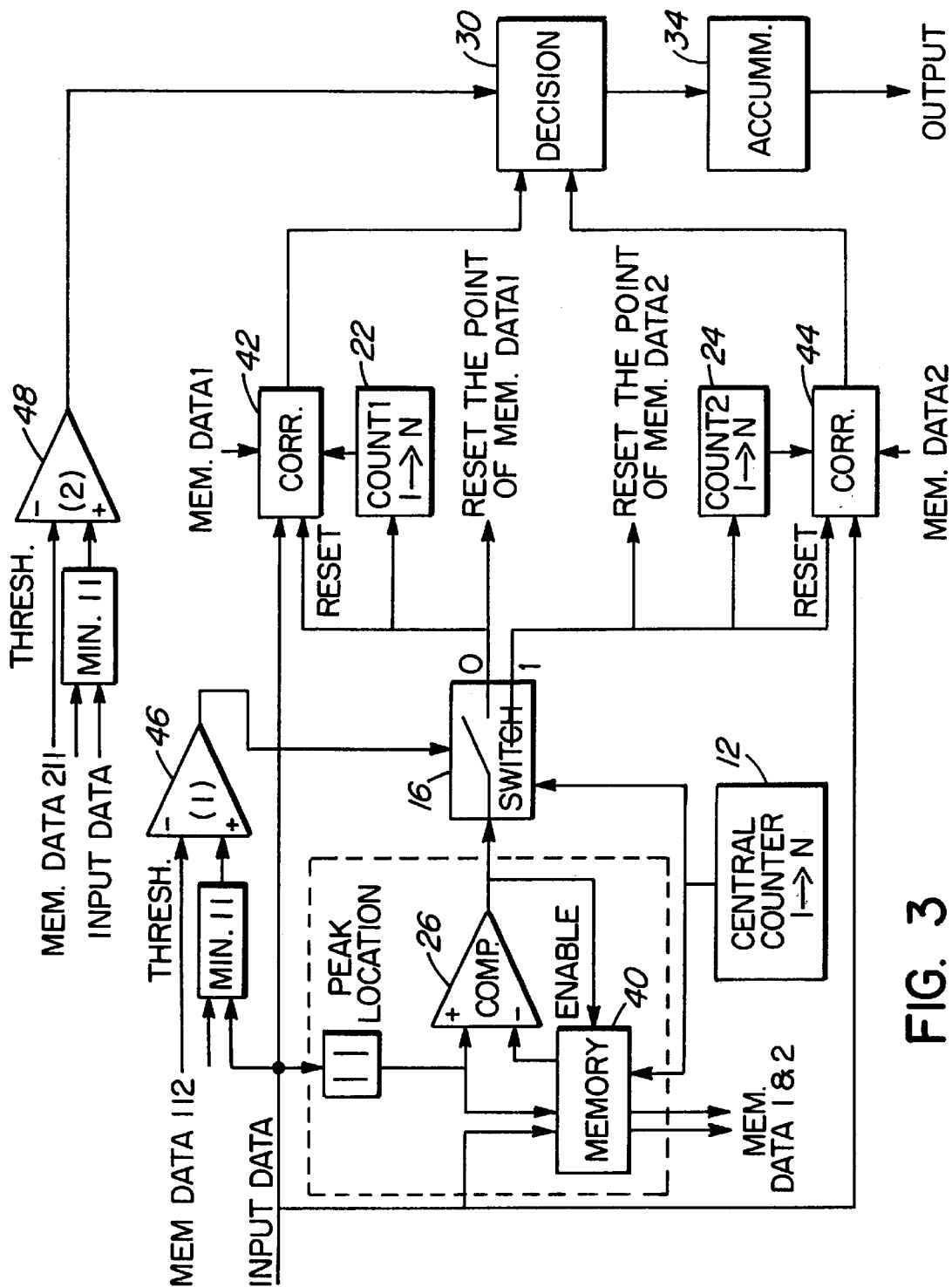
FIG. 3 is a block diagram illustrating the implementation of another embodiment of the invention.

An implementation diagram for the first embodiment is shown in FIG. 3. The main control parts are the same as shown in FIG. 1. The differences are as follows:

1) The memory 40 will not only memorize the peak values (both the current peak and the previous one), but also their locations. It also memorizes the previous data up to 2N length and sends out the data for the correlation calculation, controlled by both the "comp" 26 output and the switch 16. Whenever the "comp" 26 output is "1", the memory 40 data output pointer (either mem. data1 or mem. data2 based on the switch location) will be reset to the previous peak location and this pointer will be incremented for each subsequent frame.

2) The summation blocks shown in FIG. 1 are replaced with correlation blocks 42,44 (including two energy calculations and one correlation for the correlation coefficient calculation). Each block requires two data input ports: one is the input data sample and the other is from either the memory data output1 or memory data output2.

3) Now, because the correlation will be calculated with two blocks of data, the threshold will be compared with the minimum absolute value between the current data and the memory output data (either 1 or 2 based on the switch location). If the switch 16 turns to "0", the threshold comparator 46 will use the memory output data1 and the threshold comparator 48 will use the memory output data2. If the switch turns to "0" the situation is reversed. The functions of these two threshold comparators 46,48 are the same as described in relation to the second embodiment. The comparator 46 controls the switch 16 to decide whether it should switch or not when central counter reaches "N". The comparator 48 controls the decision block 30 to decide as to whether it should accept the current input from the correlation block 42,44 when the corresponding counter 22,24 reaches "N".

4) A single tone decision (M single decisions should be accumulated before the final tone decision is made) is when either count1 (22) or count2 (24) reaches "N", and is based on whether the correlation coefficient $r^2/E_0E_1$ is larger or smaller than the threshold (Y).

5) Tone decision will be further sent to the accumulation block 34 for the final tone decision.

Figure 4A:
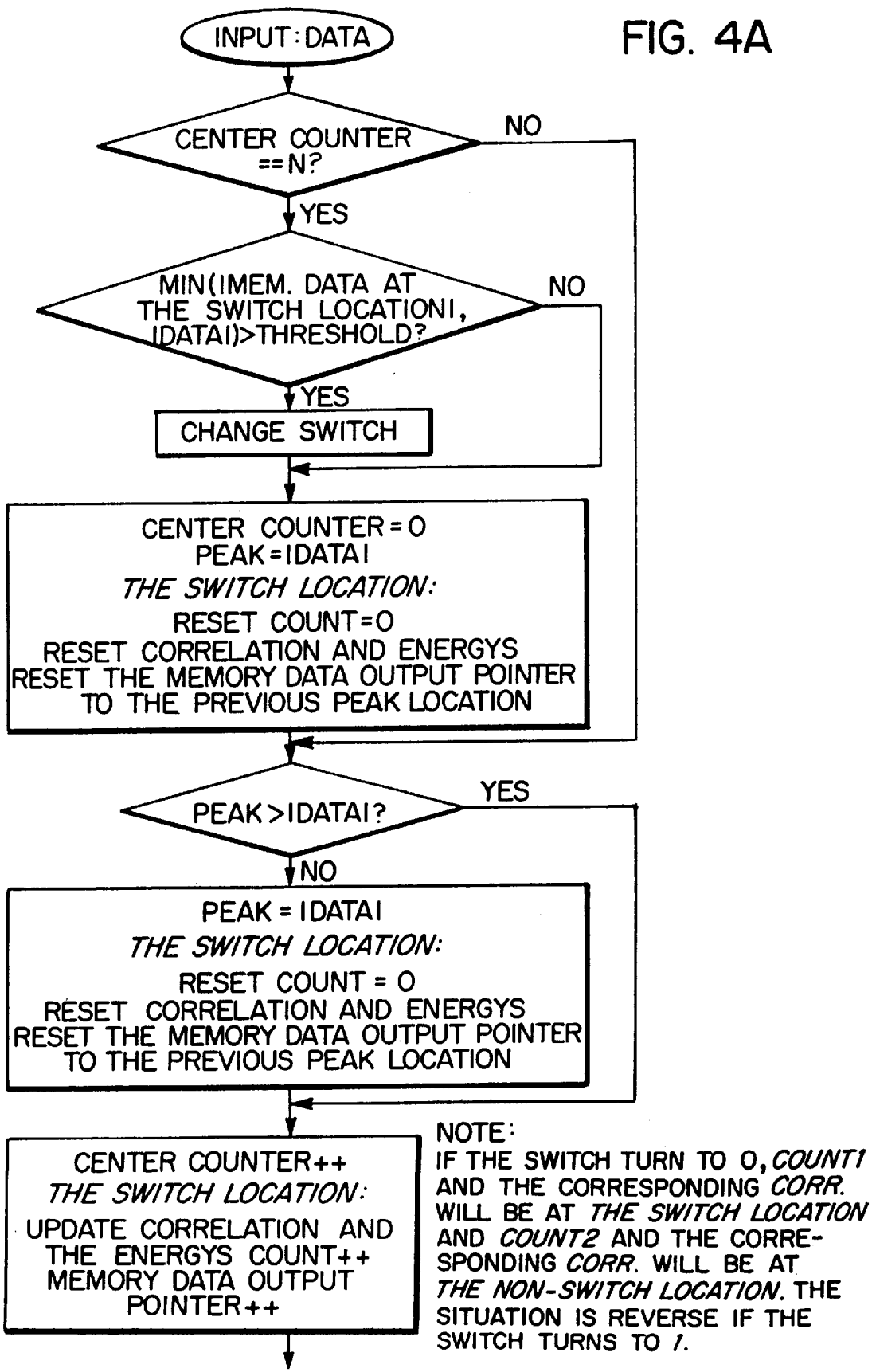
FIGS. 4A–4B is a flow chart of the process steps of the implementation of FIG. 3.
Figure 4B:
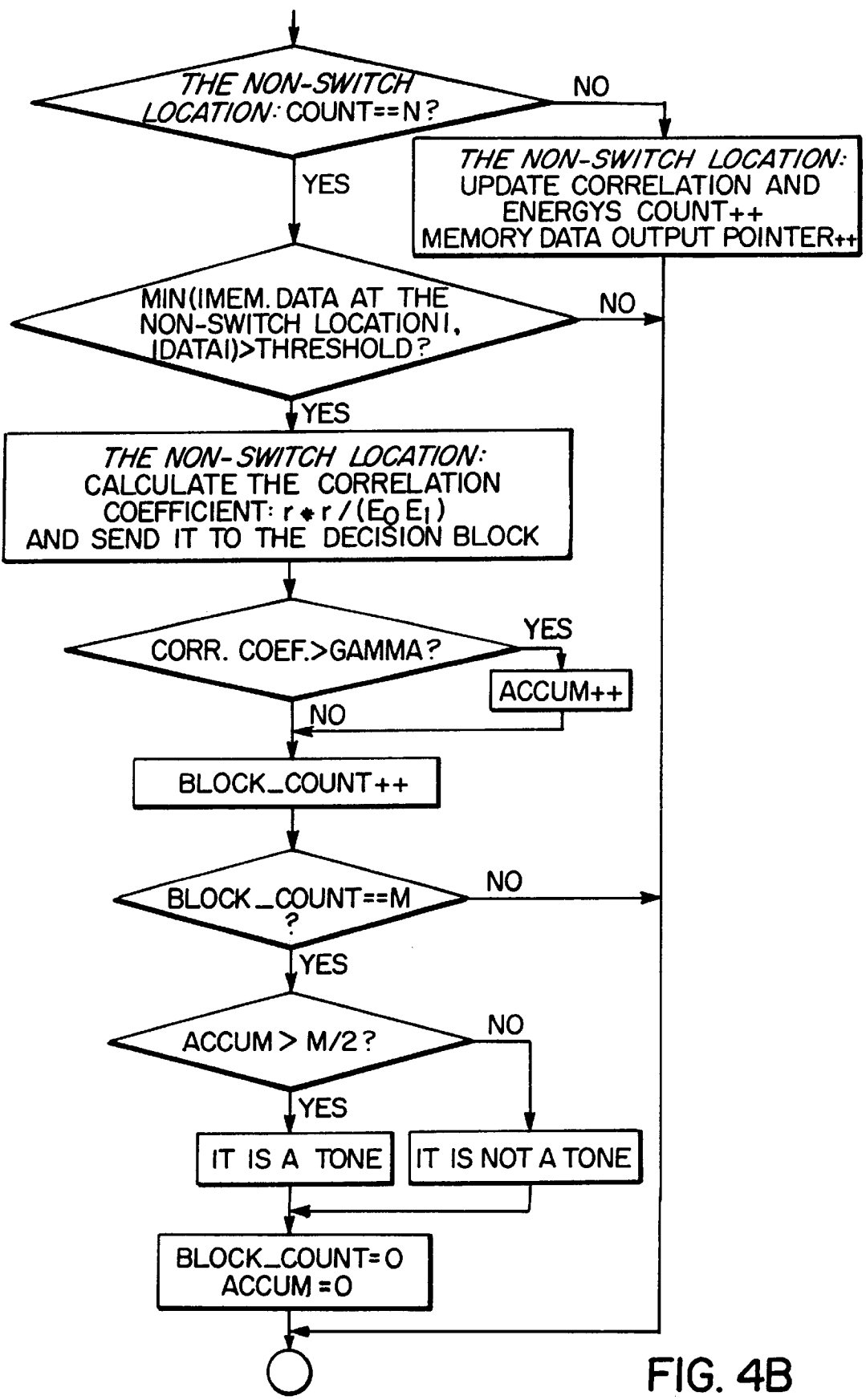

FIGS. 4A–4B is a flow chart illustrating the implementation process for the first embodiment According to the present invention, efficient and reliable tone detection algorithms have been developed. In accordance with the invention any periodical signal, including DTMF signals and low-speed modem signals, can be detected.

While specific embodiments of the invention have been described and illustrated, it will be apparent to one skilled in the art that various alternatives and variations can be implemented. It is to be understood, however, that such alternatives and variations will fall within the scope of the present invention as defined by the appended claims.

What is claimed is:

1. A tone detector for detecting periodic tones within a data signal comprising:

means to segment said data signal into fixed length data samples;

a central counter to count said data samples and to prepare a data window therefrom;

a peak value detector to monitor said data samples and to detect a sample having a peak value within said data window;

first and second summation means for alternatively receiving and counting said data signals;

switch means responsive to said central counter to alternatively switch said data samples between said first and second summation means;

means in said first and second summation means to determine if summations made thereby are valid; and decision means to compare valid summation from said first and second summation means with a threshold value and determine therefrom whether said summation represents a periodic tone.

2. A tone detector as defined in claim 1 wherein said decision means further includes an accumulation means to accumulate a plurality of positive decisions before determining said data signal is a tone.

3. A tone detector as defined in claim 2 wherein said peak value detector includes a comparator and a memory for storing a current peak value, said comparator accepting a new peak value only when the new peak value is greater than the stored current peak value.

4. A tone detector as defined in claim 3 wherein said central counter and said memory are reset when a new peak value is established.

5. A method of detecting a periodic tone in a data signal comprising:

a) forming fixed length data samples from said data signal;

b) monitoring first and second data windows, each comprising data samples taken sequentially from said data signal;

c) finding the peak value and location of said peak value in each of said data windows;

d) calculating the total energy value of said data samples in said data windows;

e) finding a correlation value respecting said data windows; and f) comparing said correlation value and said total energy for each window with a preset threshold to determine whether said data signal is a periodic tone.

6. A method as defined in claim 5 wherein said signal is a tone if $$\frac{r^2}{E_0 E_1} > \Upsilon$$

wherein $\Upsilon$=correlation factor $E_0$=energy of first data window $E_1$=energy of second data window $\Upsilon$=a threshold.

7. A method of detecting a periodic tone in a data signal comprising:

a) forming fixed length data samples from said data signal;

b) monitoring first and second data windows each comprising data samples taken sequentially from said data signal;

c) finding the peak value and location of said peak value in each of said first and second data windows;

d) calculate the p-norm summation for each peak value and location; and e) compare said p-norm summations with a threshold to determine whether said data signal is a periodic tone.

8. A method as defined in claim 7 wherein said data signal is a tone if $$\frac{|P_1 - P_0|}{P_1 + P_0} < \frac{\Upsilon}{2},$$

where $P_0$=p-norm for first window $P_1$=p-norm for second window $\Upsilon$=threshold.

* * * * *